Figure 1:
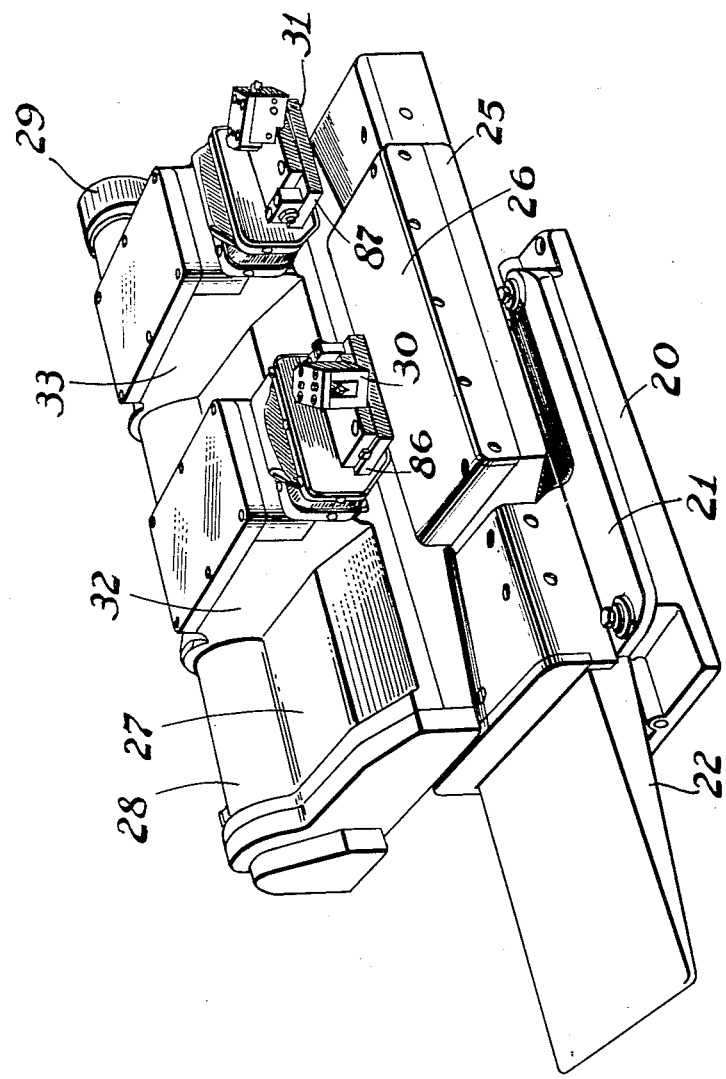

Dec. 18, 1956     N. HOGLUND     2,774,344
GRINDING WHEEL DRESSING APPARATUS

Filed April 16, 1954     9 Sheets—Sheet 1

INVENTOR.
Nils Hoglund
BY
William A. Zaluak
ATTORNEY

Dec. 18, 1956  N. HOGLUND  2,774,344
GRINDING WHEEL DRESSING APPARATUS
Filed April 16, 1954  9 Sheets-Sheet 2

INVENTOR.
Nils Hoglund
BY
William A. Zaluak
ATTORNEY

Dec. 18, 1956   N. HOGLUND   2,774,344
GRINDING WHEEL DRESSING APPARATUS
Filed April 16, 1954   9 Sheets-Sheet 4

INVENTOR.
Nils Hoglund
BY
William A. Zalesak
ATTORNEY

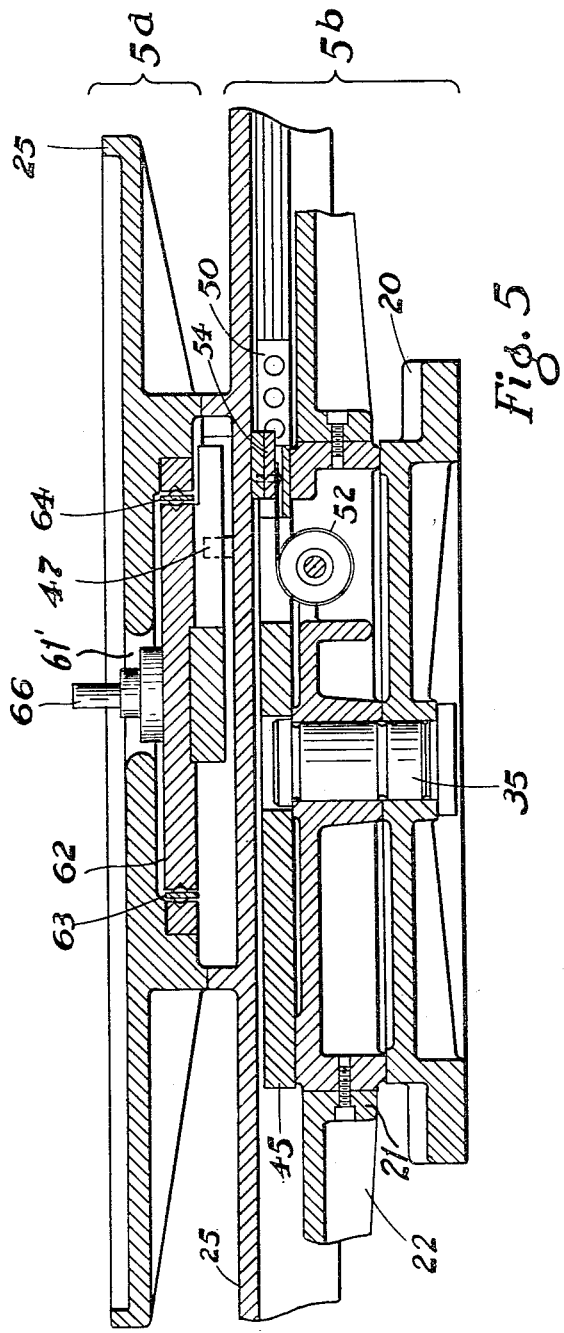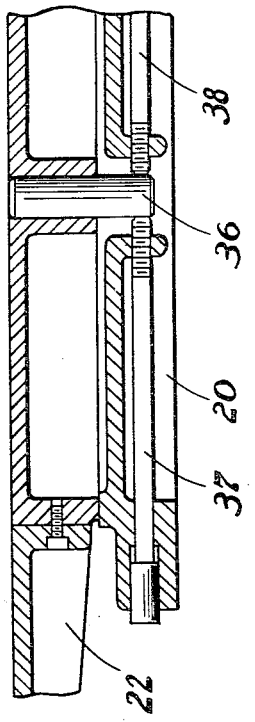

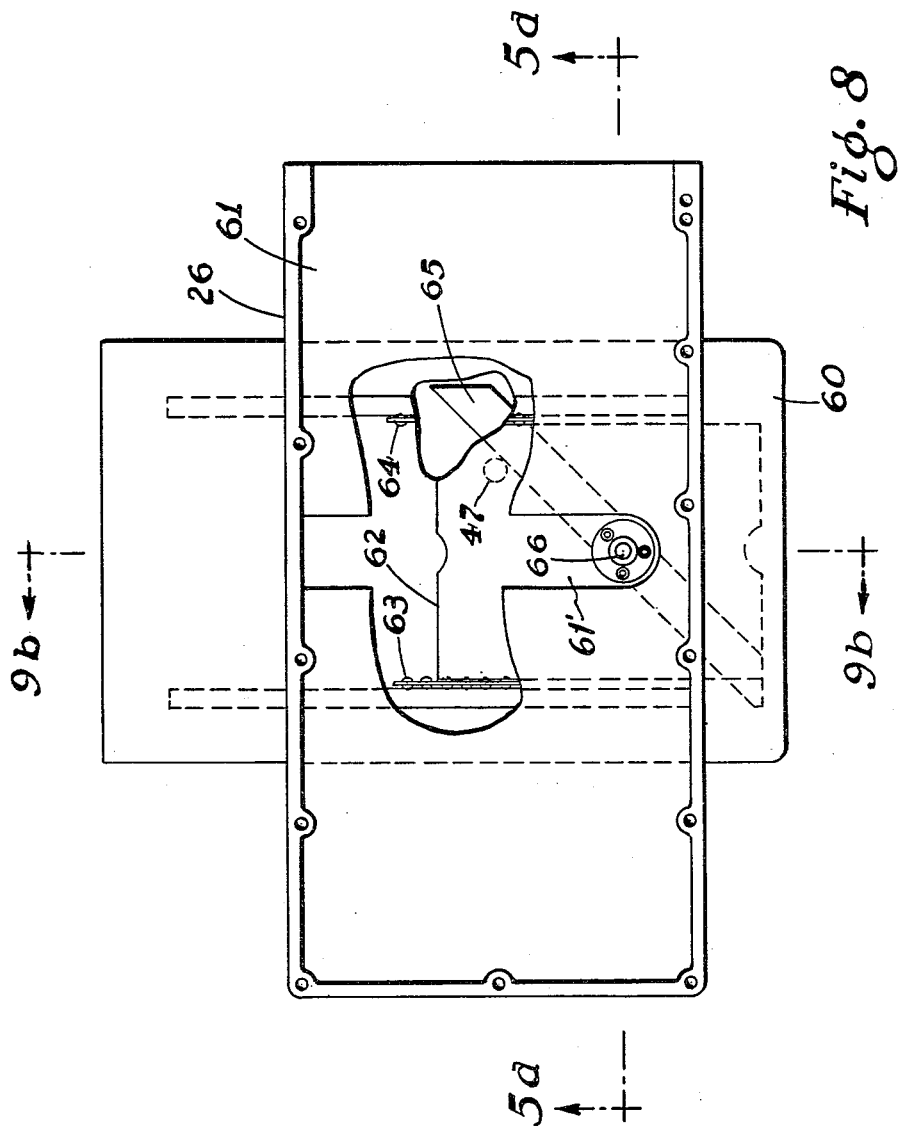

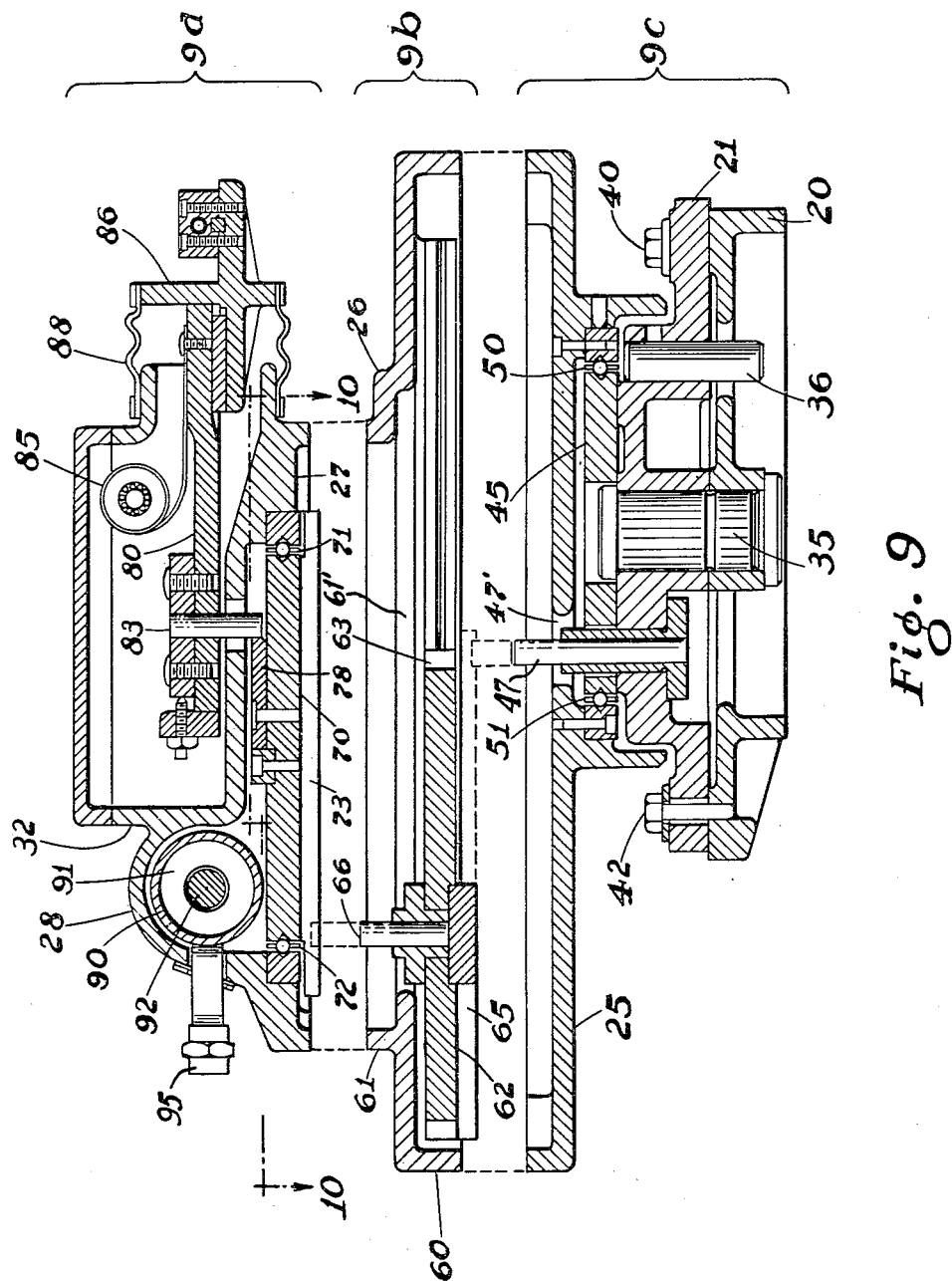

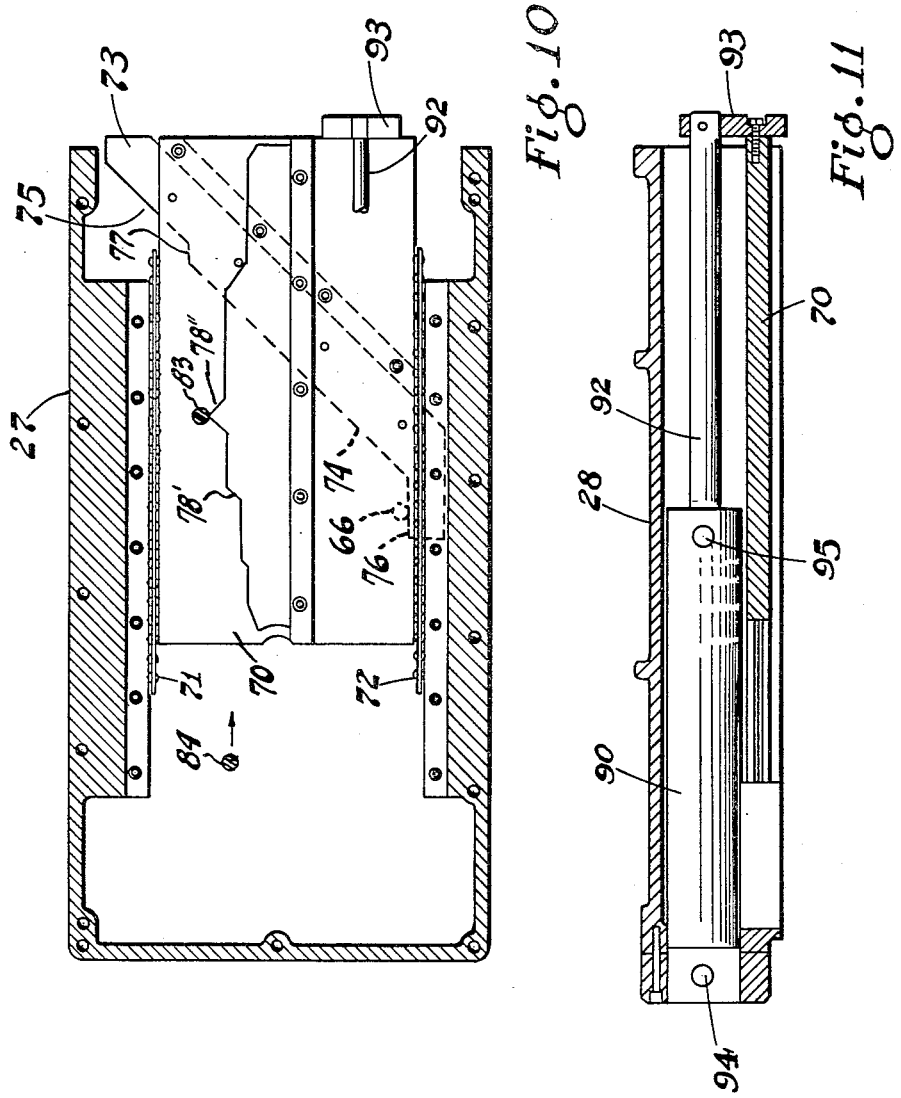

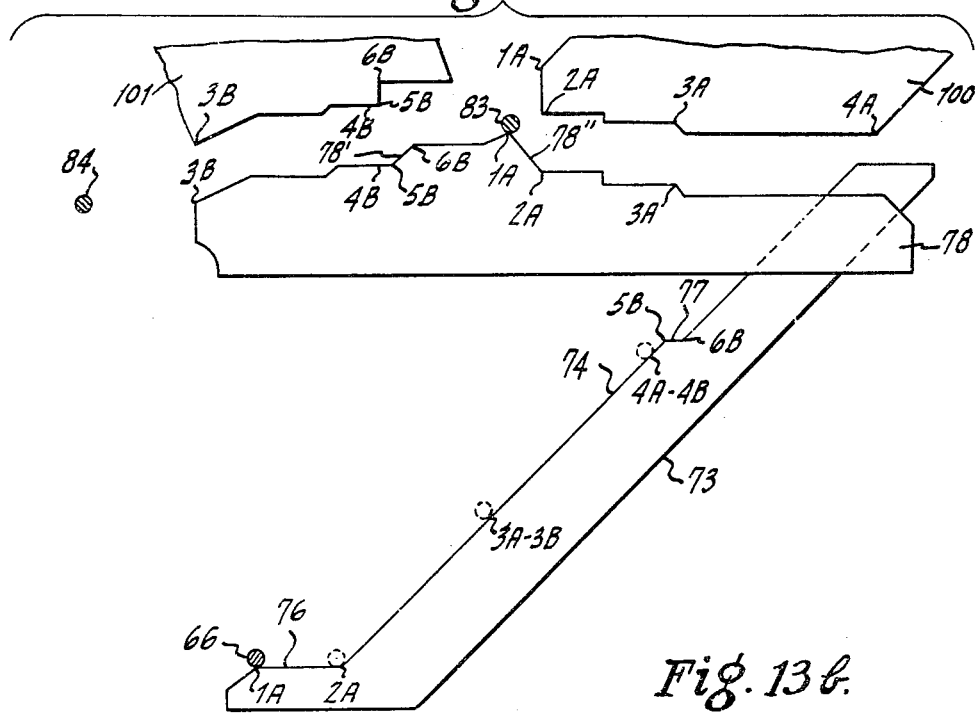
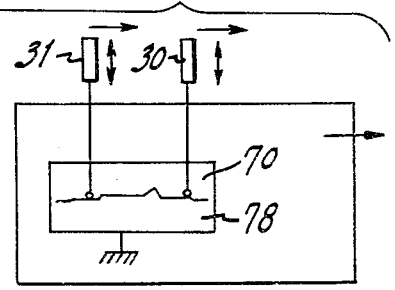
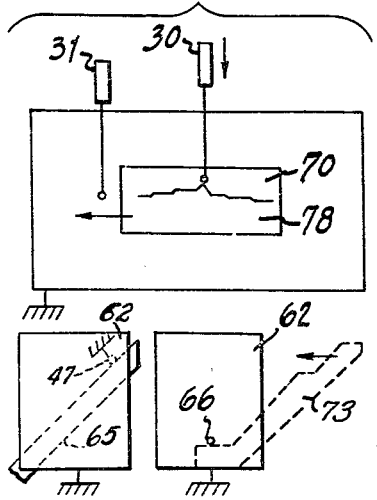
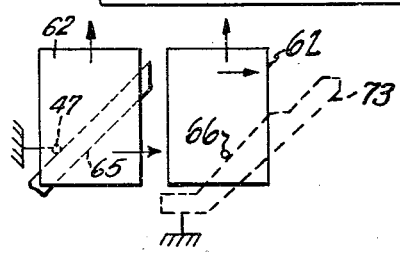

United States Patent Office 2,774,344
Patented Dec. 18, 1956

2,774,344

GRINDING WHEEL DRESSING APPARATUS

Nils Hoglund, Summit, N. J.

Application April 16, 1954, Serial No. 423,657

9 Claims. (Cl. 125—11)

My invention relates to grinding wheel contour dressing apparatus, particularly to such apparatus for simultaneously dressing complex contours on a plurality of grinding wheels.

For certain types of work grinding wheels are required to grind all the journals and all the shafts for the pulleys, gears and magneto on crankshafts used, for example, in small utility engines. Normally not less than two grinding wheels are utilized on cylindrical grinders for this type of work and the contours are of rather complex form. The dresser which must be designed to dress grinding wheels of this kind should normally have a minimum of two separate tools which have movements independent of each other and also have independent adjustments. The tools or cutting diamonds must be able to dress at angles of 90° to the axis of the grinding wheel, which part of the grinding wheel is normally used for shoulder grinding as well as grinding all the fillets and maintain the proper relationship between the different diameters of the shaft dressed on the grinding wheel. Such dressers must be capable of being lined up easily and accurately in order to provide parallel surfaces on the ground shaft. The templet controlling the dressing tool movements must be kept to a small ratio in order to maintain the dresser within the size of limited space available on the grinder. The dresser must be compact in design relative to the grinding wheels to be dressed.

The principal object of my invention, therefore, is to provide an improved grinding wheel dressing apparatus capable of dressing into the grinding wheel or wheels the profile of all of the diameters required to grind a plurality of journals and other sections of the shafts, such for example as required for the pulleys, gears and magneto required on the crankshaft of small utility engines.

Another object of my invention is to provide dressing apparatus having a plurality of dressing tools or diamonds having independent movements and adjustments and which are able to climb 90°.

A still further object of my invention is to provide such an apparatus which may be easily lined up to provide parallel surfaces on the grinding shaft.

A further object of my invention is to provide such a device or apparatus in which the templet controlling the movements of the diamond dressers is provided with a small ratio in order to provide a compact dresser usable in a limited space.

These and other objects will appear hereinafter.

According to my invention I provide a three part housing slidably carrying in the upper portion or cover thereof a pair of tools capable of movement normal to the movement of the housing which is mounted for movement parallel to the axis of the wheels being dressed. A template slide provided with a templet engaging followers connected to the tools to control the movement of the tools is slidably mounted within the housing for movement parallel to the movement of the housing and normal to the movement of the tools. The template slide has mounted on the under side thereof a cam having a contour presenting surfaces parallel to the movement of the housing and at a 45° angle to the movement of the housing. Mounted below this template slide is a secondary slide mounted for movement transversely of the movement of the housing and parallel to the movement of the tools. The secondary slide has mounted thereon a follower which engages the cam on the template slide and in turn has a cam or template mounted beneath the slide. This second cam or template engages a fixed pin in the base on which the housing is movably mounted. Tension means urge the housing and the last mentioned cam against the fixed pin. Fluid operated mechanism provides the driving power and is connected between the housing and the main template slide.

The tools mounted in the housing are mounted on slides having followers contacting the template face. Surfaces on the template are provided such that when the housing remains stationary and the template slide moves the tools can be made to move at 90° to the axis of the wheel being dressed. The template is also designed such that the tools will have no relative movement with respect to the housing when the housing is moved so that the tools are moved across the surface of the wheel being dressed to provide a surface parallel to the axis of the wheel being dressed. The tools can also be made to move relative to the housing while the housing moves. Thus it is possible to obtain all forms or contours including surfaces parallel and normal to the axis of the wheel being dressed, as well as intermediate surfaces having various other types of contours which may be straight lines or follow curved paths.

Figure 2:
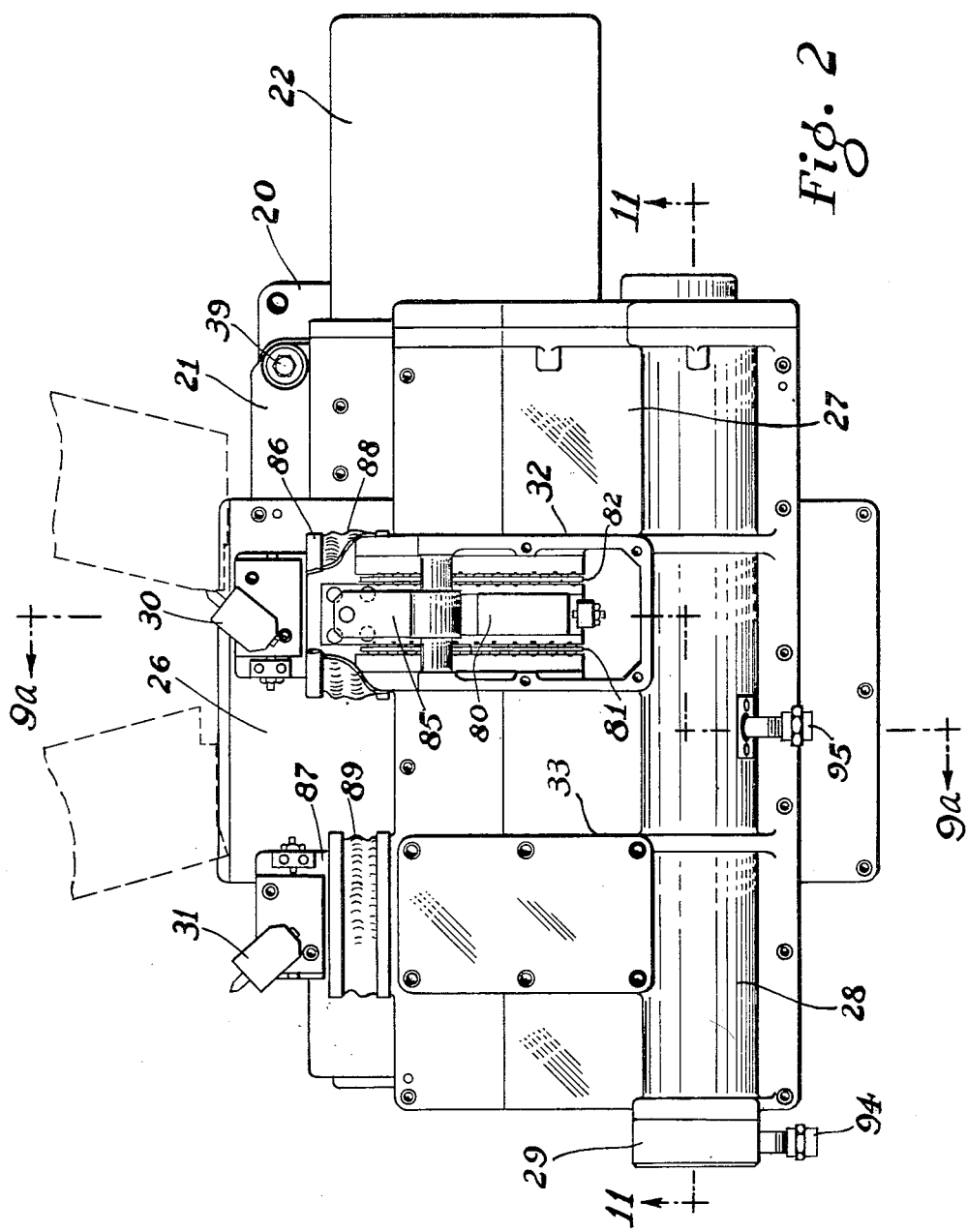
Figure 3:
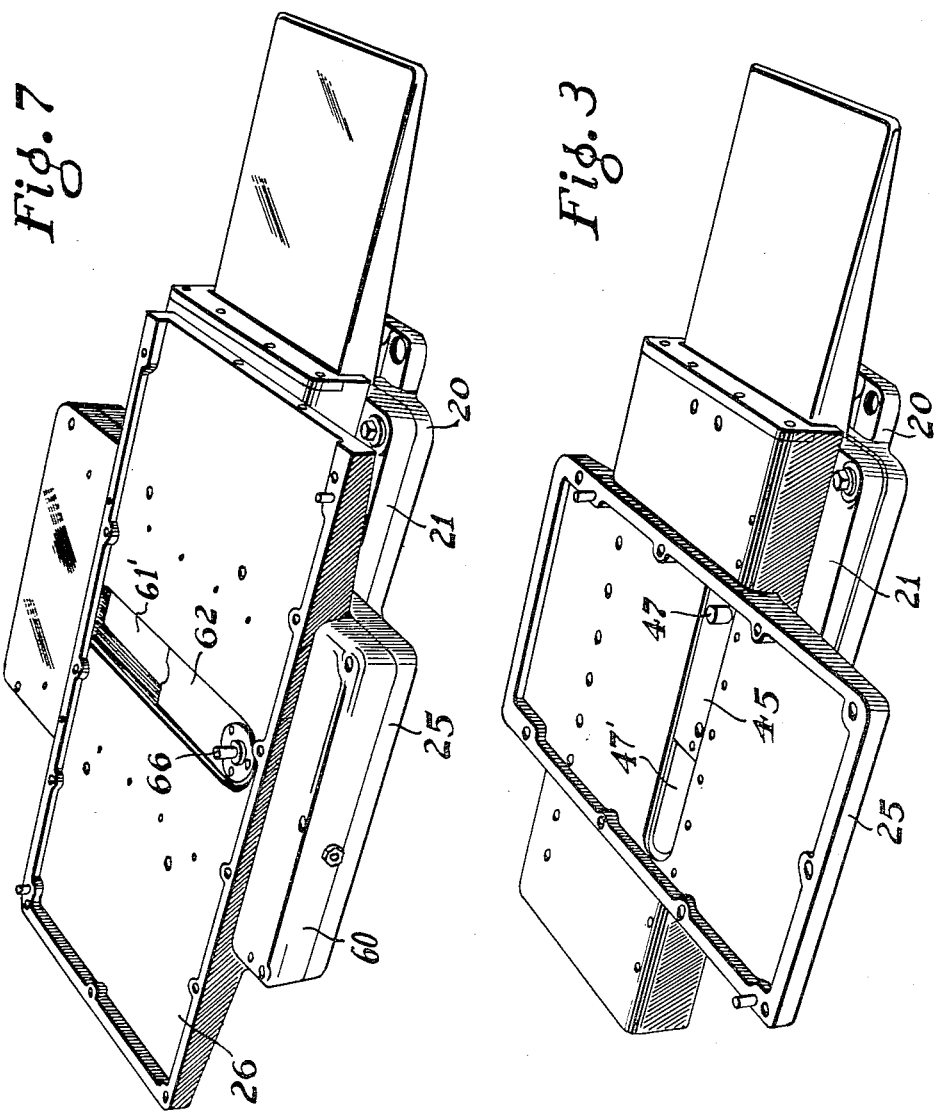
Figure 4:
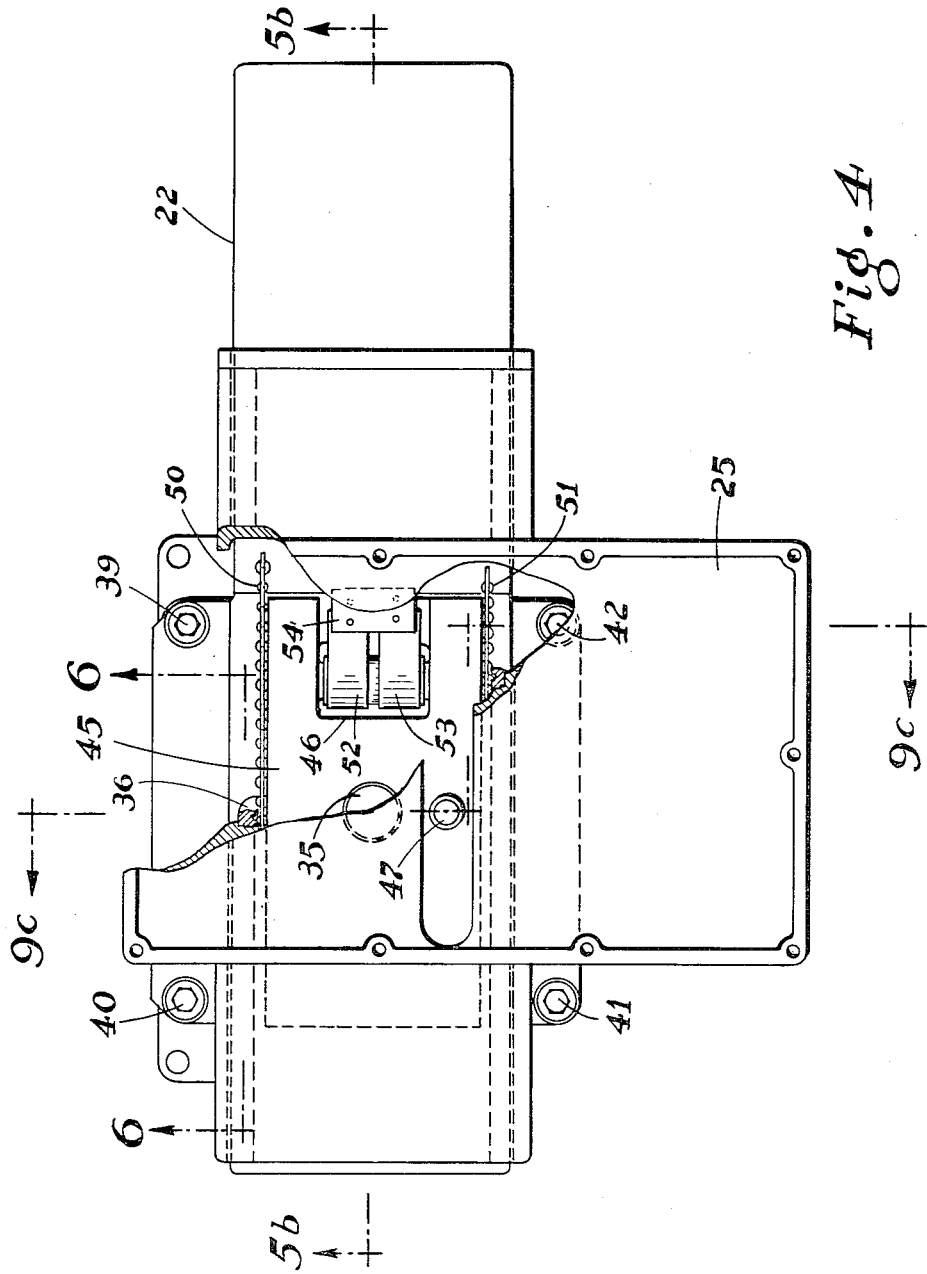

The novel features which I believe to be characteristic of my invention are set forth with particularity in the appended claims, but the invention itself will best be understood by reference to the following description taken in connection with the accompanying drawing in which Figure 1 is a perspective view of apparatus made according to my invention and showing the tool slide of the apparatus; Figure 2 is a plan view of apparatus made according to my invention with parts broken away to show details of construction of the tool slide; Figure 3 is a perspective view of the base and bottom frame of the housing portion of the apparatus made according to my invention; Figure 4 is a plan view of Figure 3 with parts broken away to show details of construction; Figure 5 is a section taken along the lines 5a—5a of Figure 8 and 5b—5b of Figure 4; Figure 6 is a partial section taken along the line 6—6 of Figure 4; Figure 7 is a perspective view of the base, the lower frame and intermediate frame of the housing forming part of the apparatus made according to my invention; Figure 8 is a plan view of the intermediate frame portion of the housing of Fig. 7 and the secondary slide with parts broken away to show details of construction; Figure 9 is an exploded sectional view of Figures 9a, 9b and 9c taken along lines 9a—9a of Figure 2, line 9b—9b of Figure 8 and line 9c—9c of Figure 4; Figure 10 is a transverse section taken along the line 10—10 of Figure 9a; Figure 11 is a section taken along line 11—11 of Figure 2; Figure 12 is a schematic diagram showing the relationship and movement of the parts during various stages of operation of an apparatus made according to my invention; and Figure 13a–13b is a diagram showing relative movement of the parts at different stages of operation.

In Figures 1 and 2, apparatus made according to my invention includes a sub-base 20 on which is rotatably mounted and accurately adjustable, a base 21 which supports a slide guide upon which the housing is movably supported in the manner to be described, and has elongated dust covers 22 extending from its ends. The housing comprises a three part assembly including a lower frame 25 which is slidably mounted on the slide guide mentioned, an intermediate frame member 26 and an upper frame or cover 27. The upper cover or frame 27 is provided with a housing portion 28 in which is mounted a hydraulically operated cylinder and piston 29 which provides the driving power for the apparatus for moving the housing longitudinally of the base and slide guide support 21 in a manner to be described.

Mounted on the housing to move transversely of the housing and normal to the path of movement of the housing are a pair of diamond dressing tools 30 and 31 which are mounted on slides to be described within the housing portions 32 and 33 of the upper frame or cover 27. The wheels being dressed are shown by dotted lines in Figure 2. The housing 27 with tools 30 and 31 have movements such that the housing remains stationary while the tools move normally of the axis of the wheels being dressed to dress the surfaces at 90° to the axis of the wheel. The housing and tools can also be moved so that the tools move parallel to the axis of the wheels being dressed to dress the surfaces on the wheel parallel to the axis. Other types of contours are produced when the housing moves and the tools simultaneously move with respect to the housing.

*Base and slide guide assembly*

Reference is made to Figures 4, 5, 6 and 9. The sub-base 20 rotatably supports the base 21 on a pin or stud 35 fixed to the sub-base. The base may be rotatably adjusted to align the base 21 so as to provide movement of the housing parallel to the axis of the wheel being ground and then locked in position. To provide for this adjustable rotation within fine limits a stud or pin 36 is fixed to the base 21 and extends downwardly through an opening in the sub-base 20. Elongated screw members 37 and 38 abut the lower end of the pin and by turning these screws fine adjustment of the position of the base on the sub-base may be made. As soon as adjustment is made the base and sub-base may be locked together by means of four machine screw bolts 39, 40, 41 and 42. The housing is slidably supported on the base 21 by means of the elongated slide guide 45 fixed to the slide guide support 22. Guide 45 has an opening 46 for receiving elements to be described. Extending through the slide guide 45 and fixed to the base 21 is a cam follower in the form of a pin or stud 47. The function of pin 47 will be described below.

*Lower frame and biasing spring*

In Figures 3, 4, 5 and 9, the lower part of the housing or lower frame 25 of the housing is slidably mounted on the slide guide 45 by means of ball bearing assemblies 50 and 51. Mounted in the opening 46 and secured to base 21 are a pair of biasing springs 52 and 53, which are springs capable of exerting a continuous even pull regardless of their extension. These are commercially available items. The outer ends of these springs are fixed to the under side of frame 25 by means of the connecting strap 54. These springs urge the housing to the left as shown in Figures 2, 3, 4 and 5 and away from the viewer as viewed from Figure 9. Follower 47 extends through the elongated opening 47' in frame 25.

*Intermediate frame and secondary slide*

Figures 3, 5, 7, 8 and 9 are referred to. This part of the apparatus provides the mechanism for controlling the movement of the housing and dressing tools relative to the base and to each other to provide the movements described above.

The intermediate frame 26 has a lower portion 60 which registers with and is fastened to the lower frame 25 and an upper portion 61 on which is supported or secured the upper member or cover 27. Mounted on the under side of the portion 60 is secondary template slide 62 slidably mounted for movement transversely of the movement of the housing by means of ball bearing assemblies 63 and 64. On the under side of the slide is the cam 65 mounted at an angle of 45° to the movement of the slide and the movement of the housing. The cam 65 is contacted by the fixed follower 47 mounted in the base for controlling movement of the housing in a manner to be described. The movement of slide 62 against pin or follower 47 gives movement to the housing 25, 26, 27.

Mounted on the top of the slide 62 is a cam follower or stud 66 which engages another cam on the template slide in a manner to be described. This follower extends through an elongated opening 61' in member 61. As the slide 62 moves from front to back in a manner to be described, since the follower 47 is fixed, the housing must move to the right as viewed in Figure 8 against the pull of biasing springs 52 and 53. Thus as the slide 62 moves in the direction of the tools mounted on the housing, the housing moves to the right as viewed in Figure 8, and as the slide 62 moves away from the tools the biasing springs force the housing to the left against the pin 47, the movement of the slide 62 and the housing being equal and transversely of each other because of the 45° angle of the cam 65. It will thus be observed that the housing will move only when the secondary slide 62 is moved but not otherwise.

*Upper frame (cover) and template (main) slide*

References are now had to Figures 1, 9 and 10. In the upper portion of the housing or cover 27 a template slide is mounted for movement parallel to the movement of the housing. On its upper surface it carries a template which determines the contour of the wheel being dressed, this template being contacted by template followers mounted on slides supporting the dressing tools. Mounted on the under side of the slide is a cam contacting the cam follower 66 so as to control relative movement of the housing and dressing tools relative to each other and to the base.

The upper frame or housing cover 27 slidably supports the template slide 70 in ball bearing assemblies 71 and 72 for movement parallel to the movement of the housing. Mounted on the under side of the slide 70 is cam 73 contacting follower 66 on slide 62. As best shown in Figure 10 this cam has surfaces 74 and 75 at an angle of 45° to the movement of the housing and portions 76 and 77, which are parallel to the movement of the slide 70 and the housing. When the slide 70 is moved because of contact of the follower 66 on the secondary slide with the surface of the cam 73 and contact of followers 83 and 84 with template 78 movement of the tools relative to each other and to the housing and movement of the slide relative to the housing and to the base takes places in a manner to be described.

On the upper side of the slide 70 is the template 78 which controls the movement of the tools transversely of the housing movement to control the depth of the cut of the diamond tools. The template contour is contacted by followers mounted on the tool slides as will be described below. The template 78 is provided with straight line portions 78' and 78" and with intermediate portions which may have any desired contour. The portions 78' and 78" are those portions which are contacted by the dresser tool followers during those periods when the secondary slide cam follower 66 moves along the surfaces 76 and 77 of cam 73. This occurs at a time when the housing is stationary and only the tools move normally to the surface of the grinding wheels being dressed. At all other times the template slide 70 remains stationary while the housing and tools move, the followers of the tool slides passing over the contour of the template 78 to produce the contours in a manner to be described.

*Tool and tool slide assembly*

The tool and tool slide assembly are best shown in Figures 1, 2, 9 and 10. The diamond dressing tools 30 and 31 are mounted on slides which move into and out of the housing and are urged into the housing by means of tensioned springs, the tool slides being provided with followers which contact the template on the template slide.

As described above the upper frame or cover member 27 is provided with housing portions 32 and 33, which have mounted therein tool slides such as slide 80 slidably mounted by means of ball bearing assemblies 81 and 82. These slides are provided with template followers 83 and 84 which contact the contoured edge of the template 78. These slides are urged against the template by means of biasing springs, such as 85, thus urging the slides into the housing. Mounted on the outer ends of the tool slides are tool supports 86 and 87 supplied with flexible dust shields 88 and 89. It is obvious that as the template slide 70 moves relative to the frame or housing that the tools will be moved in accordance with the contour of the template at the points of engagement.

Hydraulic power drive

Reference is made to Figures 2, 9, 10 and 11.

The hydraulic drive for operating the apparatus made according to my invention includes a cylinder 90 fixed to cover 27 and having a piston 91 and piston rod 92 connected to the template slide by means of the connecting block 93. Fluid under pressure may be directed to either side of the piston by means of inlet and outlet orifices 94 and 95. Thus, as shown in Figure 11, the piston is moved to its right hand limit with the template slide 70 in one of its limiting positions. If the piston is withdrawn within the cylinder the template moves to the left in its path of travel as viewed in Figures 10 and 11.

Overall operations

In Figures 12 and 13a, 13b are diagrammatically shown the various elements of an apparatus made according to my invention at various stages of operation. With reference particularly to Figures 8, 10, 12 and 13a, 13b with the parts shown in the position of Figure 10, the tools 30 and 31 have their followers in the position shown relative to template 78, with the follower 83 of the tool slide 80 carrying tool 30 at point 1A and follower 66 is in contact with cam 73 as shown. With the template slide 70 in the position shown in 13a and secondary template slide 62 shown in its relative position, as the piston is drawn within its cylinder the slide 70 moves to the left relative to the housing 27 carrying with it template 78 and cam 73. At this instant the follower 84 of tool 31 is not in contact with the template surface and therefore does not move. The follower of tool 30, however, is at the upper end of the straight line portion 78" of the template and will, therefore, be moved inwardly of the housing or toward the viewer in Fig. 12. During this period the follower 66 is moving along the portion 76 of the cam 73. There is, therefore, no movement of the slide 62 and hence no movement of the housing. As pointed out above, slide 62 (see Figs. 8 and 9) carries the cam follower 66 in contact with the cam 73, as well as template 65 contacting fixed cam follower 47. Until slide 62 carried by the housing is moved, the housing remains stationary. Thus during the movement of the slide 70, template 78, and cam 73 between positions 1A and 2A as shown in the diagram, Figure 12, dressing tool 30 moves from 1A to 2A on the grinding wheel 100. The relative movement of the slides and housing during this period is shown in Figure 13a, the arrows indicating direction of movement and ground indicating no movement.

As the slide 70 continues to move to the left the follower 66 engages the portion 74 of the cam 73 causing the slide 62 to move as shown in Figure 13b. As previously described, the housing at this point is forced to the right (see Fig. 2) against the action of the biasing springs at the same rate at which the slide 62 moves. As pointed out above, cam 73 and cam 65 both have surfaces at an angle of 45° to the path of movement of the housing. Thus, slide 62, the movement of which is controlled by cam 65 and fixed follower 47, moves transversely of the housing movement at the same rate as the housing, controlled by slide 62, moves to the right. The result is that the follower 66, which contacts cam 73 on the surface 74 and which controls movement of the slide 70, merely follows the profile of the cam at 45° without exerting any moving force on the cam 73, and hence slide 70 remains stationary relative to ground. This is because the resultant motion of follower 66 is along a 45° angle relative to the movement of the slide 70 and the housing. This results in the template slide 70 remaining stationary with respect to the base, but since the tools are fixed to the housing and can move only normally to the movement of the housing, they in turn will also move to the right moving in and out or toward and from the axis of the wheel being dressed in accordance with the contour of the stationary template which is being contacted by followers 83 and 84 of the tools 30 and 31.

Thus as follower 66 moves from 2A to 3A—3B the housing carries the tools to the right as viewed in Figures 2, 10, 12 and 13b. Since the template slide 78 is now stationary relative to the base, the tool followers follow the template contour first from 2A to 3A when follower 84 of tool 31 contacts the template. After follower 66 passes 4A, 4B point 5B is reached. Here a 90° cut is made. Again as described above the housing remains stationary and tool 31 moves in on wheel 101 from 5B to 6B. At 6B the follower 66 again reaches a 45° angle on cam 73 causing the housing again to move and the template slide 70 and template 78 to remain stationary.

It will be observed when the follower of a tool slide engages any template surface parallel to the movement of the housing that the tool will remain stationary with respect to the housing and thus produce a dressed surface which is parallel to the axis of the wheel being ground.

It is obvious that the reverse action of that described above will take place when the piston is forced to the right as viewed in Figure 11.

Thus, while controlling the relative movement of the template, slides and the housing, relative to the base and independently controlling the movement of the individual tool slides any contour can be dressed.

I claim:

1. A grinding wheel dressing apparatus including a base, a frame slidably mounted on said base for movement in one direction, a dressing tool mounted on said frame and movable normally to said one direction, a first slide on said frame movable parallel to the movement of said frame, a second slide on said frame movable parallel to the movement of said tool, connections between said base and said second slide, connections between said tool and said first slide, and means connected between said first and second slides whereby movement of said one slide causes movement of said frame relative to said base while said tool remains stationary relative to said frame or causes relative movement of said tool with respect to said frame while said frame remains stationary with respect to said base.

2. A grinding wheel dressing apparatus including a base, a frame slidably mounted on said base for movement in one direction, a plurality of dressing tools mounted on said frame and movable normally to said one direction and independently of each other, a first slide on said frame movable parallel to said one direction, and a second slide on said frame movable transversely of said one direction, connections between said base and said second slide, connections between said tools and said first slide, and means connected between said first and second slides whereby movement of said first slide causes movement of said frame relative to said base while said tools remain stationary relative to said frame or causes relative movement of said tools with respect to each other and to said frame while said frame remains stationary with respect to said base.

3. A grinding wheel dressing apparatus including a base, a frame movably mounted on said base for movement in one direction, a dressing tool mounted on said frame for movement normal to said one direction, a template slide on said frame, a template on one side of said slide and a cam on the other, said template slide being movable parallel to said one direction, a follower connected to said tool and contacting said template, a second slide on said frame and movable transversely of the movement of said template slide, a follower on one side of said second slide contacting said cam and a cam mounted on the other side of said second slide, a follower fixed to said base and contacting said last cam and means for moving said template slide relative to said housing, said cams and said template being formed to cause movement of said template slide relative to said base while said housing remains stationary with respect to said base or causing movement of said housing relative to said base while said template slide remains stationary with respect to said base.

4. A grinding wheel dressing apparatus including a base, a housing movably mounted on said base for movement in one direction, a plurality of dressing tools mounted on said housing for movement normal to said one direction, a template slide within said housing and having a template on one side thereof and a cam on the other, said template slide being movable parallel to said one direction, followers connected to said tools and contacting said template, a second slide within said housing and movable transversely of the movement of said template slide, a follower on one side of said second slide contacting said cam and a cam mounted on the other side of said second slide, a follower fixed to said base and contacting said last cam and means for moving said template slide relative to said housing, said cams and said template being formed to cause movement of said template slide relative to said base while said housing remains stationary with respect to said base for causing movement of said housing relative to said base while said template slide remains stationary with respect to said base.

5. A grinding wheel dressing apparatus including a sub-base, an elongated base and slide guide support rotatably mounted on said sub-base, a housing slidably mounted on said slide guide to move longitudinally thereof in one direction, said housing comprising a lower frame, an intermediate frame and a cover, a plurality of tool slides mounted within said cover and supporting dressing tools at the outer ends thereof and movable normally to said one direction, a template slide mounted within said cover and movable within said housing parallel to said one direction, a template mounted on one side of said slide, template followers mounted on said tool slides for contacting said template, a cam mounted on the other side of said template slide, said cam having surfaces parallel to and others at an angle to the movement of said slide, a secondary slide mounted in the intermediate frame and having a follower on one side contacting said cam on said template slide, and a cam on the other side of said secondary slide and having a surface at a 45° angle to said one direction, the cam surfaces at an angle on each of said cams being generally inclined in the same direction, a fixed cam follower on said base contacting said last template, and fluid operated means connected between said housing and said template slide for causing relative movement of said housing and said template slide whereby said housing or said template slide may remain stationary or move with respect to said base, and said tool slides may move relative to each other and to said housing or remain stationary with respect to said housing, and means biasing said housing and secondary slide against said fixed cam follower.

6. A grinding wheel dressing apparatus including a base, a movable supporting member movable along said base in one direction, dressing tools slidably mounted on said supporting member, a pair of slides mounted on said supporting member, one slide being movable transversely of said one direction and the second slide parallel to said one direction, connections between said second slide and said tools for controlling movement of said tools, a cam mounted on said second slide, a follower mounted on said one slide and engaging said cam, said cam having surfaces parallel to and at an angle to said one direction, a cam on one slide, a fixed cam follower mounted on said base and contacting said last cam whereby said housing remains stationary while said second slide is moved, and said housing moves while said second slide remains stationary, the connection between said tools and the second slide causing said tools to be moved perpendicularly to the movement of said housing while the housing remains stationary.

7. A grinding wheel dressing apparatus including a sub-base, a housing slidably mounted on said base to move longitudinally thereof in one direction, said housing comprising a lower frame, an intermediate frame and a cover, a plurality of tool slides mounted within said cover and supporting dressing tools at the outer ends thereof and movable normally to said one direction, a template slide mounted within said cover and movable within said housing parallel to said one direction, a template mounted on one side of said slide, template followers mounted on said tool slides for contacting said template, and biasing means urging said tool slides and followers against said template, a cam mounted on the other side of said template slide, said cam having surfaces parallel to and at an angle to the movement of said slide, a secondary slide mounted in the intermediate frame, a follower on one side of said secondary slide contacting said cam on said template slide, and a cam on the other side of said secondary slide and having a surface at a 45° angle to said one direction, the cam surfaces at an angle on each of said cams being generally inclined in the same direction a fixed cam follower on said base contacting said last template, fluid operated means connected between said housing and said template slide for causing relative movement of said housing and said template slide whereby said housing or said template slide may remain stationary or move with respect to said base, and said tool slides may move relative to each other and to said housing or remain stationary with respect to said housing while said housing moves, and biasing means for urging said secondary slide and said housing against said stationary cam follower.

8. A grinding wheel dressing apparatus including a base, a housing slidably mounted on said base to move longitudinally thereof in one direction, said housing comprising a lower frame, an intermediate frame, and a cover, a tool slide mounted within said cover and supporting a dressing tool at the outer end thereof said tool slide being movable normally to said one direction, a template slide mounted within said cover and movable within said housing parallel to said one direction, a template mounted on one side of said slide, template follower mounted on said tool slide and contacting said template, a cam mounted on the other side of said template slide, said cam having surfaces parallel to and at an angle to the movement of said slide, a secondary slide mounted in the intermediate frame and having a follower mounted on one side contacting said cam on said template slide, and a cam on the other side of said secondary slide and having a surface at a 45° angle to said one direction, the cam surfaces at an angle on each of said cams being generally inclined in the same direction, a fixed cam follower on said base contacting said last template, and fluid operated means connected between said housing and said template slide for causing relative movement of said housing and said template slide whereby said housing or said template slide will remain stationary or move with respect to said base, and said tool slide will move relative to said housing or remain stationary relative thereto.

9. A grinding wheel dressing apparatus including a base, a housing slidably mounted on said base to move longitudinally thereof in one direction, a plurality of tool slides mounted within said housing and supporting dressing tools at the outer ends thereof, said tool slides being movable normally of said one direction, a template slide mounted within said housing and movable within said housing parallel to said one direction, a template mounted on one side of said template slide, template followers mounted on said tool slides and contacting said template, a cam mounted on the other side of said template slide, said cam having surfaces parallel to and at an angle to the movement of said slide, a secondary slide mounted in housing and having a follower mounted on one side contacting said cam on said template slide, and a cam on the other side of said secondary slide and having a surface at a 45° angle to said one direction, the cam surfaces at an angle on each of said cams being generally inclined in the same direction a fixed cam follower on said base contacting said last template, and means connected between said housing and said template slide for causing relative movement of said housing and said template slide whereby said housing or said template slide will remain stationary or move with respect to said base, and said tool slides will move relative to each other and to said housing or remain stationary with respect to said housing while said housing moves.

References Cited in the file of this patent
UNITED STATES PATENTS

| | | |
|---|---|---|
| 2,476,322 | Peters | July 19, 1949 |
| 2,658,500 | Hoglund | Nov. 10, 1953 |
| 2,659,358 | Hill | Nov. 17, 1953 |
| 2,659,359 | Hill | Nov. 17, 1953 |